May 19, 1931.  C. C. WILLIAMS  1,806,229
VALVE ACTUATING MECHANISM
Filed Oct. 26, 1927
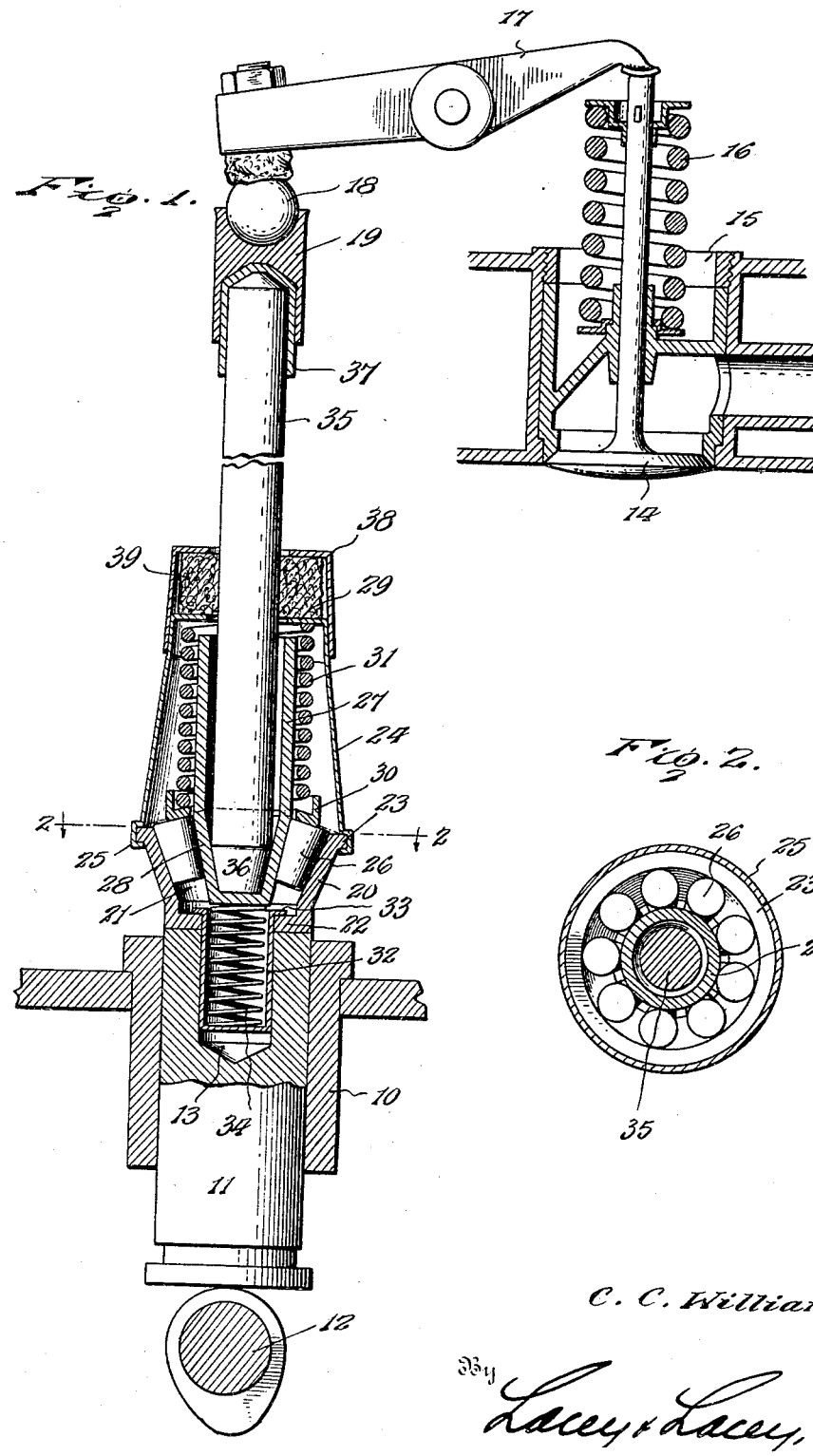
Inventor
C. C. Williams.
By Lacey & Lacey, Attorneys Patented May 19, 1931

1,806,229

UNITED STATES PATENT OFFICE

CALVIN C. WILLIAMS, OF PHILADELPHIA, PENNSYLVANIA

VALVE ACTUATING MECHANISM

Application filed October 26, 1927. Serial No. 228,893.

This invention relates to an improved valve actuating mechanism of the general character disclosed in my co-pending application for a similar invention filed November 12, 1926, Serial No. 148,054 as well as a second application for a similar invention filed April 7, 1927, Serial No. 181,787.

The invention seeks among other objects, to provide a mechanism including a push rod incorporating a novel slip joint automatically operable to accommodate lengthening or shortening of the rod and wherein the spring employed for lengthening the rod will be of such expansive strength that the push rod will be properly lengthened during each cycle of the valve at high engine speeds.

The invention seeks, as a further object, to prevent freezing of the rollers of the slip joint such as would otherwise be occasioned by the use of a strong spring so that the push rod will be properly elongated and all looseness and play between the parts taken up.

And the invention seeks, as a still further object, to provide for general increase in efficiency as well as effect a reduction in the cost of manufacture and assembly.

Other objects of the invention not specifically mentioned in the foregoing will appear during the course of the following description.

In the accompanying drawings:

Figure 1 is a vertical sectional view showing my improved mechanism in connection with a conventional overhead valve, and Figure 2 is a transverse sectional view on the line 2—2 of Figure 1, looking in the direction indicated by the arrows, this view particularly showing the clutch rollers of the slip joint.

Referring more particularly to the drawings, I have shown a fixed tappet guide at 10, and slidable through said guide is a tappet 11 operable by a cam shaft 12, the tappet being provided at its upper end with the customary axial recess 13. A conventional overhead valve of an internal combustion engine is indicated at 14, and slidably supporting the valve is a cage 15, the valve being normally held closed by a spring 16. Mounted to coact with the upper end of the valve stem is a rocker 17 carrying an adjustable ball 18, and formed to coact with said ball is a socket 19.

In carrying the invention into effect, I employ a push rod embodying a female clutch member which includes a clutch cup 20 having a conical inner face 21. The cup is provided with a flat bottom wall 22 which rests flat against the upper end of the tappet 11, and surrounding the upper end of said cup is an overhanging flange 23. Surrounding said flange is an upstanding frusto-conical cap or housing 24 provided at its lower end with a channel member 25 tightly embracing the flange 23 for rigidly connecting the cap to the cup. Disposed within the clutch cup is a series of conical or longitudially tapered clutch rollers 26, and housed within the cap 24 is a tubular male clutch member 27 tapered at its lower end portion to provide a clutch cone 28 which rests within the series of rollers 26 to coact therewith, the clutch member being closed at its lower end by an end wall. The cap 24 is provided at its upper end with an end wall 29, and freely surrounding the clutch member 27 to rest against the larger upper ends of the rollers 26 is an annular follower 30 upturned at its peripheral margin to provide a spring seat. Resting at its lower end within said seat and at its upper end against the end wall 29 of the cap is a spring 31. Extending snugly through the bottom wall 22 of the clutch cup 20 is a tubular axially disposed socket 32 which is removably received more or less freely within the recess 13 of the tappet 11. The socket member is closed at its lower end and formed on the upper end thereof is an annular flange 33 seating against the inner face of the bottom wall 22 of the clutch cup for limiting the socket against outward displacement. Resting at its lower end against the bottom wall of the socket and at its upper end against the lower end wall of the clutch member 27 is a spring 34. In this connection, it should be observed that the spring 31 is of far less strength than the spring 16 of the valve, while the spring 34 is of far less strength than the spring 31.

Extending freely through the top wall of the cap 24 of the female clutch member is a push rod element 35 which is freely accommodated within the male clutch member 27 and is provided at its lower end with a tapered terminal 36 snugly but removably fitting within the tapered clutch cone 28 of said member, the male clutch member thus providing a socket for said element. Snugly fitting over the element 35 at its upper end is a head 37 and, as will be observed, the socket 19 is shaped to snugly fit over said head. Freely surrounding the rod element 35 is a cap 38 frictionally fitting tightly over the upper end of the cap 24, and enclosed by the cap 38 is a felt or equivalent element 39 slidably receiving the push rod element therethrough. This felt is preferably saturated with oil which, during the operation of the mechanism, will find its way into the slip joint for maintaining the parts lubricated.

As will be observed, the male clutch member 27 and associated parts are enclosed by the female clutch member 20 and cap 24 to provide a permanently assembled slip joint which is separate and distinct. Accordingly, when installing the mechanism the slip joint may be first connected with the tappet 11, when the push rod element may be inserted at its lower end into the male clutch member 27 and the socket 19 disposed over the head 37 to coact with the ball 18. As will be perceived, the socket 32 will coact with the tappet 11 for maintaining the female clutch member in alinement with the tappet.

Before the joint is installed, the upper end of the male clutch member 27 is held by the spring 31 against the top wall 29 of the cap 24. However, at the time of installation of the mechanism, the ball 18 is adjusted downwardly on the rocker 17 for partially depressing the push rod element 35 and consequently partially depressing the male clutch member 27, as shown in Figure 1, so as to provide a clearance between the upper end of the male clutch member and the top wall of the cap as well as to take up all looseness and play in the mechanism between the cam shaft and valve stem. As will be seen, the spring 31 will press downwardly at its lower end on the clutch rollers 26 and cause said rollers to coact with the clutch cone 28 of the male clutch member 27 for forcing said member upwardly. Upward movement of the push rod element 35 under the urge of the spring 31 will, of course, be limited by the engagement of the rocker 17 with the upper end of the stem of the valve 14 so that since the clutch cone 28 of the clutch member 27 will thus, in effect, provide for the clutch rollers 26, an abutment limited against upward movement, said rollers will also coact with the clutch cup 20 for forcing said cup downwardly and constantly holding the cup in solid engagement with the upper end of the tappet 11. Play between the parts will thus always be taken up and looseness or rattling permanently avoided. Moreover, the tappet 11 will be constantly held against the coacting cam of the cam shaft 12 so that tappet rattling will also be eliminated.

Assuming now that the tappet 11 is raised, the upward thrust or jar of the tappet will, as will be observed, be transmitted directly to the clutch rollers 26 and, of course, at the instant such upward thrust is transmitted to said rollers, the push rod element 35, rocker 17, and valve 14 will be at rest. Accordingly, the inertia of these parts will be sufficient to maintain the push rod element stationary momentarily and oppose the upward thrust or jar of the tappet with sufficient force to cause upward endwise slipping of the clutch rollers with a coincident upward movement of the clutch cup 20 independently of the clutch cone 28. The follower 30 is therefore shifted upwardly by the rollers to compress the spring 31 and, due to the difference in the angularity of the clutch face 21 of the cup and the face of the clutch cone, the rollers are, of course, independently shifted upwardly a distance greater than the independent upward movement of the clutch cup. The push rod is thus automatically contracted, but as the tappet continues in its upward movement and the inertia of the push rod element, rocker, and valve is overcome, the upward slipping of the clutch rollers is arrested substantially at the instant the push rod element begins to yield to the upward movement of the tappet, when said rollers wedge between the clutch face 21 of the cup and the clutch cone 28 of the male clutch member 27 to provide a rigid connection between said cup and the push rod element so that the valve is opened.

Due to the automatic contraction of the push rod as the valve is opened, the opening travel imparted to the valve will be correspondingly shortened. Accordingly, upon the return of the tappet downwardly, the valve will seat before the tappet reaches the bottom of its throw so that the push rod element 35 will be relieved of the downward pressure otherwise exerted thereon by the valve spring 16. As a result, the spring 31 will, as the tappet completes its downward movement, expand for again shifting the clutch rollers 26 downwardly within the clutch cup 20 and thus lift the push rod element, so that the parts will be returned to their original positions, while all looseness between the parts will be automatically taken up. Rattling will thus be effectually prevented. Should the valve fail to seat properly, the push rod will, as will be understood in view of the foregoing description, be permitted to automatically expand to compensate for the shortened closing travel of the valve while, when the valve is subsequently permitted to move into engagement with its seat, the repeated jarring communicated from the tappet to the clutch rollers, incident to the actuation of the tappet, will cause said rollers to slip upwardly so that the push rod will be caused to automatically contract to compensate for the increased closing travel of the valve.

In order to effect expansion of the mechanism at high engine speeds, it has been found desirable to make the spring 31 of considerable strength so that after the valve 14 has seated, the clutch rollers 26 may be quickly shifted downwardly for lifting the push rod element 35 before the ensuing upward movement of the tappet 11 occurs. However, tests have shown that when the spring 31 is of considerable strength, as above indicated, the clutch rollers tend to stick or freeze between the clutch cup 20 and the clutch cone 28 of the male clutch member slightly before the push rod element 35 has been lifted to the limit of its upward movement, with the result that a slight play remains between the push rod element and the tappet as well as between the tappet and the upper end of the valve stem. Accordingly, the spring 34 is provided to push upwardly on the male clutch member for accelerating the upward movement thereof incident to each cycle of the valve and overcome the tendency of the clutch rollers to stick so that freezing of the rollers is prevented while also, the push rod element 35 is elevated to take up all looseness and play between the parts. The spring 34 will also, of course, press downwardly on the tappet 11 so that the tappet will, at all times, be maintained in contact with the coacting cam of the cam shaft. As a result, the mechanism is entirely quiet in operation. In the present instance I have shown and described the invention in connection with an overhead valve. However, I do not wish to be limited in this respect, since as will be appreciated, the invention is also applicable for use in connection with poppet valves as now conventionally employed upon internal combustion engines.

Having thus described the invention what I claim is:

1. An automatic take-up device including relatively movable male and female members, wedging means shiftable for spacing said members, primary yieldable means exerting a lifting action on one of the members and tending to advance said wedging means for lifting said member, and auxiliary yieldable means disposed to exert a lifting action directly on said member for assisting in the spacing of the members.

2. An automatic take-up device including relatively movable male and female members, wedging means shiftable for spacing said members, primary yieldable means acting on said wedging means for spacing the members, and auxiliary yieldable means expanding against one of the members in the direction of spacing movement thereof for accelerating the spacing movement of such member.

3. An automatic take-up device, including a female clutch member, a male clutch member, wedging means interposed between said members and shiftable for spacing the members, primary yieldable means acting on said wedging means for spacing the members, and auxiliary yieldable means expanding against the male clutch member in the direction of spacing movement thereof for accelerating the spacing movement of the male member.

4. An automatic take-up device including a clutch cup having an inclined face, a clutch member extending into the cup and provided with an inclined face, clutch rollers interposed between said faces to coact therewith and shiftable for spacing said member with respect to the cup, a spring acting on said rollers for spacing said member, a socket carried by the cup, and a second spring disposed in said socket to bear against said member for accelerating the spacing movement thereof.

5. An automatic take-up device including a clutch cup, a socket carried by the cup and receivable in the recess of a tappet for centering the cup with respect to the tappet, a clutch member, clutch rollers interposed between said member and the cup to coact therewith and shiftable for spacing said member with respect to the cup, said member being adapted to carry a push rod element, primary yieldable means acting on said rollers for spacing said member with respect to the cup and elevating said rod element, and auxiliary yieldable means acting on said member for accelerating the spacing movement thereof.

6. An automatic take-up device including a clutch cup having an inclined face, a clutch member extending into the clutch cup and provided with an inclined face, clutch rollers interposed between said faces to coact therewith and shiftable for lifting said member, a spring acting on said rollers for lifting said member, and a second spring expanding upwardly against said member for exerting a lifting action thereon.

In testimony whereof I affix my signature.

CALVIN C. WILLIAMS. [L. S.]